United States Patent [19]

Capodieci

[11] Patent Number: 5,026,188
[45] Date of Patent: Jun. 25, 1991

[54] RESIN DISPENSER WITH COMBINED COOLING AND HEATING TUBE

[75] Inventor: Ronald F. Capodieci, Saugus, Calif.

[73] Assignee: Lockheed Corporation, Calabasas, Calif.

[21] Appl. No.: 448,415

[22] Filed: Dec. 11, 1989

[51] Int. Cl.⁵ .............................................. B05C 5/04
[52] U.S. Cl. .................................... 401/1; 401/2;
    219/230; 222/146.1; 222/146.5; 222/146.6;
    392/385; 392/385
[58] Field of Search .................... 401/1, 2; 222/146.1,
    222/146.2, 146.5, 146.6; 219/230, 373

[56] References Cited

U.S. PATENT DOCUMENTS

| 1,449,517 | 3/1923 | Lame | 401/2 |
|---|---|---|---|
| 1,968,992 | 8/1934 | Conkling | 222/146.5 |
| 2,681,685 | 6/1954 | Arkless | 401/1 X |
| 3,281,576 | 10/1966 | Cooper et al. | 222/146.5 X |
| 3,838,240 | 9/1974 | Schelhorn | 401/2 X |
| 3,973,697 | 8/1976 | Crum et al. | 222/146.1 X |
| 4,065,057 | 12/1977 | Durmann | 219/373 X |
| 4,260,439 | 4/1981 | Speer | 156/98 |
| 4,548,341 | 10/1985 | Hambleton | 222/146.5 |
| 4,642,158 | 2/1987 | Sternel et al. | 156/497 |
| 4,804,110 | 2/1989 | Sperry et al. | 222/146.6 X |

FOREIGN PATENT DOCUMENTS

| 2134948 | 2/1973 | Fed. Rep. of Germany | 219/230 |
|---|---|---|---|
| 3403036 | 8/1985 | Fed. Rep. of Germany | 219/230 |
| 136457 | 7/1979 | German Democratic Rep. | 401/2 |
| 507051 | 6/1971 | Switzerland | 219/230 |
| 521466 | 10/1976 | U.S.S.R. | 222/146.5 |

Primary Examiner—Steven A. Bratlie
Attorney, Agent, or Firm—Louis L. Dachs

[57] ABSTRACT

The invention is a device for dispensing melted resin on a surface. In detail, the invention includes a housing having an inlet and an outlet passages and a guide passage therebetween. The inlet passage is adapted to receive a solid resin rod and the outlet passage includes a nozzle for dispensing the melted resin to the surface. Also included is a mechanism to sequentially move the rod from the inlet toward the outlet passage. Additionally, a heating coil is positioned about the outlet passage. An air transfer tube is provided having an inlet coupled to and a source of pressurized air and an outlet in proximity to the nozzle. The tube includes a first coil section mounted about the heating coil so that the pressurized air is heated prior to reaching the nozzle such that the surface is heated. The tube also includes a second coil section about the internal passage in series with the first coil section, such that the second coil section is cooled preventing the solid resin from melting until it enters the outlet passage.

3 Claims, 1 Drawing Sheet

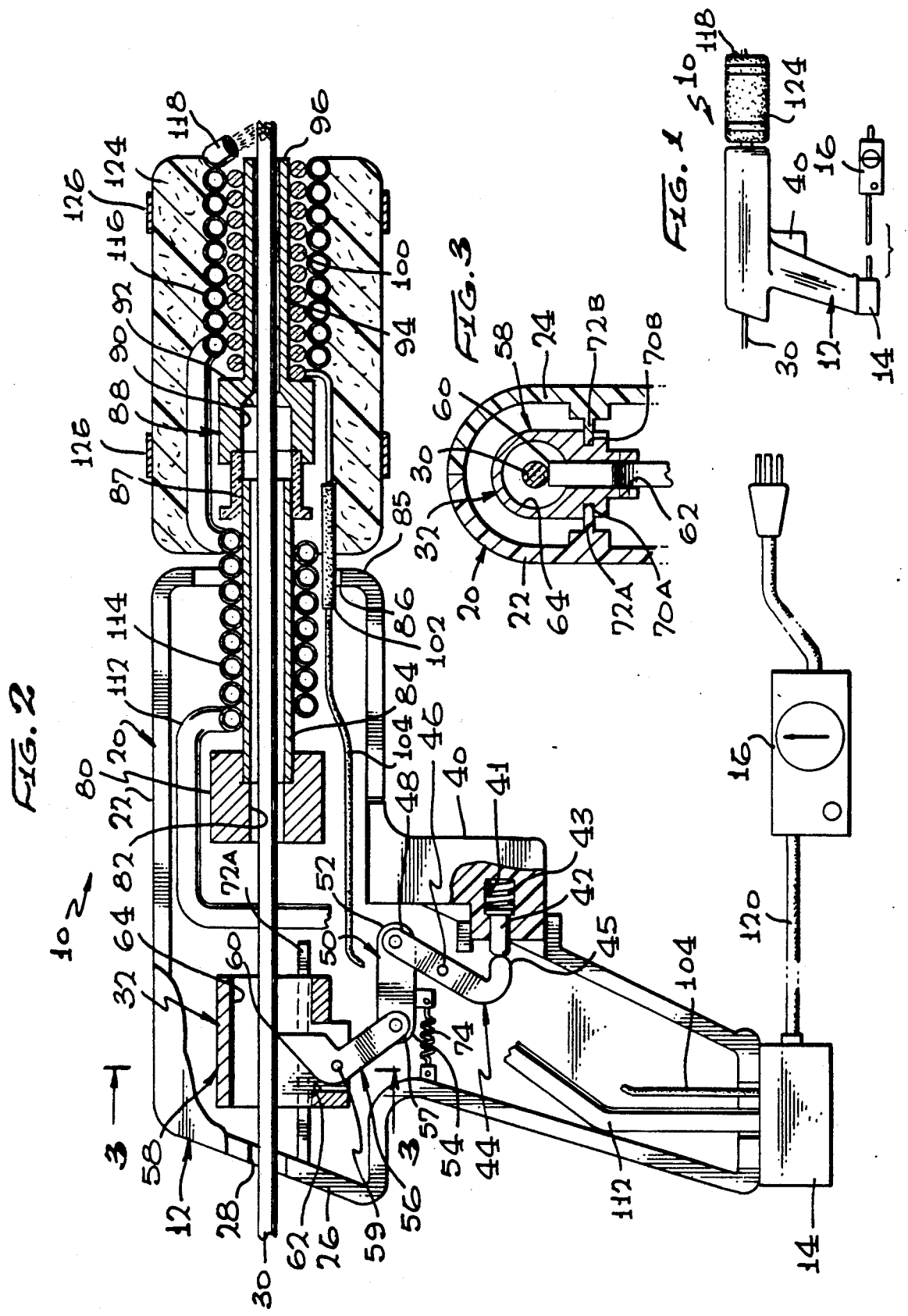

RESIN DISPENSER WITH COMBINED COOLING AND HEATING TUBE

BACKGROUND OF THE INVENTION

1. Technical Field

The invention relates to the field of portable resin dispensers and, in particular, to pistol types using solid tubular shaped resin rods which are melted prior to application.

2. Description of the Related Art

When assembling thermoplastic composite parts for subsequent forming into a single integral assembly, it is often necessary to precisely locate the parts and hold them in place during the molding process, such as in the step of vacuum bagging and the like. This is easily accomplished by tack welding using a thermoplastic filler rod. When making field repairs to a composite structure, the filling of cavities or cracks is also easily accomplished using portable resin dispensers. These are just two of the applications for portable resin dispensers which can accurately apply melted resin in precise amounts to a surface.

Portable resin dispensers are quite common and are usually in the shape of pistols. The most notable is the portable glue gun wherein a rod of glue is loaded from the back end and sequentially advanced by the pull of a trigger. A resistance heating coil is mounted in the barrel and activated to melt the glue or at least heat it to a point wherein it becomes a paste that can be easily applied to a surface. A more sophisticated version can be found in U.S. Pat. No. 4,647,158 "Hot Glue Pistol" by Sternel et al. Here, there is no heating coil, but a separate blower which is used to direct hot air to the bonding location. The blower incorporates a nozzle assembly which is used to direct hot air to the bonding location. The nozzle also supports the glue gun portion and heats the glue to its melting temperature by conduction. While this device would work well with low temperature glue, its use with high temperature thermoplastic resins, with melting points in the 700° F. range, would create problems. For example, there would be a lag in raising the thermoplastic resin to the melting temperature due to the need to conduct heat through the nozzle structure. Furthermore, the heat transferred to the glue gun portion would be so great that it would tend to melt the whole resin rod. Also of interest is U.S. Pat. No. 4,260,439 "Apparatus and Method for Repairing Plastic Materials" by Speer which discloses a hot air gun for curing vinal upholstery material. Powdered vinal is placed on the spot to be repaired and hot air is ejected from a nozzle which melts the vinal into the tear or the like. This apparatus is not readily applicable to the task at hand, since it would be extremely difficult to precisely locate powdered thermoplastic resin precisely and maintain it in position when tacking structural parts together prior to forming a complicated structure.

Thus, it is a primary object of the subject invention to provide a portable resin dispenser capable of applying melted resin at a precise location.

It is a still further object of the subject invention to provide a portable resin dispenser that can preheat the surface prior to the application of melted resin so as to provide a superior bond.

It is a still further object of the subject invention to provide a portable resin dispenser for dispensing thermoplastics having melting temperatures in the 700° F. range.

SUMMARY OF THE INVENTION

The resin dispenser comprises a resin dispenser pistol which is coupled to an air pump and electrical power supply. The pistol comprises a housing having an aperature at its rear end for receiving solid rod in the form of a tubular shaped rod. The resin is sequentially advanced through the pistol by means of a trigger activated advancing mechanism which is conventional in nature and can be found in most glue guns.

Also mounted within the housing is a passageway for the rod which includes a hollow metal bushing. A metal tube portion is joined to the bushing and extends out of the front of the housing through an aperature. The opposite end of the tube is joined to a hollow ceramic bushing which in turn is joined to a metal outlet tube having a nozzle for dispensing melted resin. Wound about the nozzle is a heating coil which incorporates an integral thermocouple to monitor the temperature thereof. The air pump is attached to an air tube which winds about the tube portion forming a first air coil section and which extends out the front end of the housing. The air tube then winds about the heating coil, forming a second air coil section, and terminates in an outlet port in proximity to outlet of the nozzle.

With the resistance heating coil producing over 700° F. (necessary to melt some thermoplastics) a lot of heat is transferred from the nozzle to the tube and housing. The first coil section of the air tube having cool air flowing therein, reduces the heat transfer to the housing and the tube preventing premature melting of the resin rod. The second coil section of the air tube is wound about the heating coil is heated up to high a temperature along with the air flowing therethrough. This heated air exits the nozzle outlet and is used to preheat the surfaces to which the resin is to be applied, providing a higher strength and more uniform bond between the surface and the resin.

Electrical wire harnesses connect both the thermocouple and heating coil, as well as the power line for the pump to the power supply. The power supply monitors the temperature of the heating coil via the thermocouple and applies power appropriately to maintain the coil at the desired temperature. Finally, a layer of insulation is placed about the heating coil and held banded thereto by straps. Thus, it can be seen that the resin dispenser is portable, and yet can dispense resins with melting temperatures of over 700° F.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a side view of the resin dispenser along with its air pump and power supply.

Illustrated in FIG. 2 is a cross sectional view of the resin dispenser shown in FIG. 1.

Illustrated in FIG. 3 is a partial cross sectional view of FIG. 2 taken along the line 3—3.

DESCRIPTION OF THE PREFERRED EMBODIMENT

Referring to FIGS. 1 and 2 it can be seen that the resin dispenser, generally designated by numeral 10, comprises a resin dispenser pistol 12, coupled to an air pump 14 and power supply 16. The pistol 12 comprises a split housing 20 having housing halves 22 and 24 held together by fasteners (not shown). The pistol 12 includes a rear end 26 having an aperature 28 for receiving the solid resin in the form of a tubular shaped rod 30. This rod can be made up of pure resin or resin filled with chopped fibers.

The resin is sequentially advanced through the pistol by means of an advancing mechanism, generally indicated by numeral 32. The mechanism 32 is conventional in nature and can be found in typical glue guns, thus, it is only discussed in general terms. Still referring to FIG. 1 and additionally to FIG. 3, it can be seen that the mechanism 32 comprises a trigger 40 slideably mounted in the housing 20. It incorporates a bore 41 containing a cam 42 biased by spring 43 towards end 26. When the trigger is pulled the cam 40 comes into contact with a link 44 at its end 45. The link 44 is pivotally mounted at its center 46 to the housing 20 and at its opposite end 48 to link 50 at its end 52. The link 50 at its opposite end 54 is rotatably coupled to link 56 at end 57 and pivotally coupled to a sequencer 58 near its middle at point 59. The opposite end 60 of the link 56 is pointed and extends through aperature 62 and into bore 64 of the sequencer 58. The sequencer 58 further includes grooves 70A and 70B on its sides which slideably engages rails 72A and 72B in the housing halves 22 and 24, respectively.

Thus, when the trigger 40 is pulled back, cam 42 is brought into contact with end 45 of the link 44, with spring 43 inducing a progressive resistance to provide "feel". This causes link 44 to rotate about point 46 and pulls link 50 forward. This in turn causes link 56 to rotate about point 59 and end 60 into engagement with the rod 30. At this point, further rotation is thus prevented and additional forward motion of the link 50 causes the sequencer to move forward on guide rails 72A and 72B advancing the rod 30. Release of the trigger 40 will allow spring 74, which has been placed in tension, to retract the link 50 causing the sequencer 58 to return to its original position.

Also mounted within the housing 20 is a metal bushing 80 having an aperature 82 therein for receiving the rod 30. A metal tube 84 is joined to the bushing 80 and extends out of the front end 85 of the housing through aperature 86. The opposite end of the tube 84 is joined to a hollow ceramic insulating bushing 87. The bushing 80, tube 84 and bushing 87 form a guide passage. The bushing 87, in turn, is joined to an outlet tube 88. The outlet tube 88 includes, in series, an inlet guide bore 90, a transition section 92 and a final bore 94. Again in the process to be subsequently discussed, the rod 30 is melted in the bore 94 and exits out nozzle 96 of the outlet tube 88.

Wound about the tube nozzle 88 is a commercially available heating coil 100, for example, a close wound Mighty-Band coil manufactured by Tempco Electric Heating Corporation, Orange, California. It is capable for producing temperatures for over 1,000° F. It also incorporates an integral thermocouple (not shown), so that the temperature of the coil can be monitored. The coil 100 further includes a connector 102 which couples to wire harness 104 (includes power and thermocouple lines). Although bore 94 is shown slightly larger in cross-section than the rod 30 for purposes of illustration, preferably, the bore 94 is slightly smaller in cross-section than the rods 30 so that it cannot slide out of the resin dispenser. When the heating coil 100 is "on" the temperature of the outlet tube 88 is such that the rod starts to melt at the transition section 92 and easily deforms as it enters the bore 94 and, of course is fully melted when it exits the nozzle 96.

The air pump 14 is attached to the housing and is coupled to a metal inlet tube 112. The metal inlet tube 112 is wound about the tube 84 forming a first air coil section 114 which extends out the front end 85 of the housing 20 through aperature 86. The tube 112 then winds about the heating coil 100 forming a second air coil section 116 and terminates in an outlet port 118 in proximity to outlet 96 of the nozzle 88.

With the resistance heating coil 100 producing over 700° F. (necessary to melt some thermoplastics) a lot of heat is transferred from the nozzle 88 to the tube 84. The first coil section 114 having cool air flowing therein reduces the heat transfer to the housing 20 and the tube 84 preventing premature melting of the resin rod 30. The ceramic bushing 87 also reduces heat transfer into tube 84. The second coil section 116, wound about the coil 100, is heated up to high temperatures along with the air flowing therethrough. This heated air exits outlet port 118 of the tube 112 and is used to preheat the surface (not shown) so as to produce a higher strength and more uniform bond between the surface and the resin.

The electrical harness 104 passes through the pump 14 and is combined with the power line (not shown) for the pump to form a wire harness 120 which connects to the conventional power supply 16. The power supply 16 monitors the temperature of the coil via the thermocouple (not shown) and applies power appropriately to maintain the coil 100 at its desired temperature. Finally, a layer of insulation 124 is placed about the coil 116 and banded thereto by straps 126.

Thus, it can be seen that the resin dispenser is portable and yet, can dispense thermoplastic resins with melting temperatures of over 700° F. This is made possible by the unique construction using dual air coil sections, one to cool and one to heat air to be applied to the surface for preheating.

While the invention has been described with reference to a particular embodiment, it should be understood that the embodiment are merely illustrative as there are numerous variations and modifications which may be made by those skilled in the art. Thus, the invention is to be construed as being limited only by the spirit and scope of the appended claims.

Industrial Applicability

The invention has applicability to industries requiring the application of melted resins.

I claim:

1. A resin dispenser for receiving solid resin in the form of a tubular rod and dispensing melted resin on a surface comprising:
    a housing assembly having an inlet and outlet passage and a guide passage there between, said inlet for receiving the rod and said outlet passage having a nozzle for dispensing the melted resin to the surface;

means to sequentially move the rod from said inlet passage towards said outlet passage;
heating coil means positioned about said outlet passage for melting the rod;
air supply means comprising:
- a source of pressurized gas; and
- a gas transfer tube having an inlet coupled to said source of pressurized gas and an outlet in proximity to said nozzle, said outlet for directing air to the surface, said tube further having first and second coil sections, said first coil section wound about said heating coil means and said second coil section positioned behind said first coil section and would about said guide passage; and power supply means coupled to said heating coil means to control the temperature thereof.

2. The resin dispenser as set forth in claim 1, wherein said source of said pressurized gas is an air pump.

3. The resin dispenser as set forth in claim 2, wherein said nozzle and a portion of the outlet passage therebehind has a smaller cross-section than the rod.

* * * * *